March 20, 1934.   W. H. RISING   1,951,950

METHOD AND APPARATUS FOR COOLING GLASS ARTICLES

Filed May 29, 1933

INVENTOR.
WALTER H. RISING
BY
ATTORNEYS.

Patented Mar. 20, 1934

1,951,950

UNITED STATES PATENT OFFICE 1,951,950

METHOD AND APPARATUS FOR COOLING GLASS ARTICLES

Walter H. Rising, Corning, N. Y., assignor to Corning Glass Works, Corning, N. Y., a corporation of New York Application May 29, 1933, Serial No. 673,535

8 Claims. (Cl. 49—45)

This invention relates to a method and apparatus for cooling glass articles for the purpose of controlling the amount and location of the strain in the finished articles.

It has been proposed to temper glass sheets by chilling them between cooling elements such elements comprising either heat absorbing surfaces or air jets directed on the opposite flat faces of the heated sheets. Glass articles have also been tempered by heating them to a predetermined temperature and quenching them in a liquid medium which is heated to a lower degree. All prior methods of tempering glass sheets or articles by chilling have aimed at the creation of uniform compressional stresses in the surface layers of the glass and the confinement of the accompanying tensional stresses to the interior of the glass. Conversely, prior methods of annealing have aimed at the elimination of stresses or the reduction thereof to a negligible amount.

Prior methods of tempering or annealing glass articles have failed to give a uniform final stress condition because of the tendency of the edge or rim of the article to cool more rapidly than portions which are remote from the edge. This differential cooling is due to the fact that at the edge of the glass article the surface area per unit volume of glass is much greater than at points remote from the edge. The result has been failure to attain proper control of stresses near the edges of the article in the cooling operation.

It is an object of this invention to control the production and distribution of permanent stress which is produced in glass articles by cooling.

The above and other objects may be attained by practicing my invention which embodies among its features reflecting into selected areas during the cooling of a glass article some of the heat which is radiated from other areas of the article.

Another feature of the invention is a cooling element, the face of which has a substantially uniform coefficient of reflection and which is so shaped as to form a reflector, the planes of which rise progressively to a point which is substantially at the center of the face.

My invention further resides in the novel construction, combination, and arrangement of parts to be more fully described herein, claimed in the appended claims, and illustrated in the accompanying drawing, in which:

Prior methods of tempering and annealing glass articles have allowed the edges thereof to cool at a faster rate than the other portions of the article. In cooling a glass article by inserting it between but out of contact with cooling elements, the relative distance between the glass article and the faces of the cooling elements has little effect upon the rate of cooling of the glass, provided that air currents near the glass are absent. I have found that by reflecting aside some of the heat which is radiated from selected areas of a glass article, as for example from the central areas of a glass sheet, and then by causing the reflected heat to fall upon other areas of the article, such as the edges, and by causing some of the heat which is radiated from the edges to be reflected back into the edges, I can control the cooling rate of all portions of the article and hence can control the production and distribution of permanent stress therein.

Figure 1:
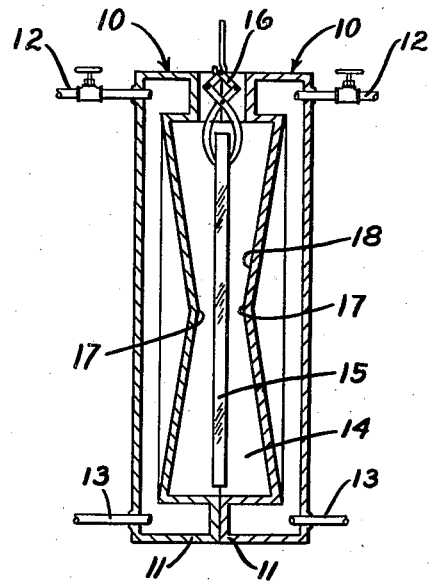
Fig. 1 is a vertical sectional view of a device for cooling glass sheets in accordance with my invention.

For example, in Fig. 1 I have shown a device constructed in accordance with my invention for cooling glass sheets in a controlled manner. The device comprises a pair of cooling elements generally designated 10 which are formed of cast iron or other suitable heat conducting material and which have projecting flanges 11 around their edges. The elements are hollow and are provided with inlets 12 and outlets 13 for the circulation of cooling fluid. The elements may be hinged or slidably mounted to permit their being separated or brought together and when in the closed position as shown the flanges 11 butt together to form a chamber 14. A sheet of glass 15 which has been heated to a temperature above the strain point of the glass is supported in the chamber 14 by any suitable means as by tongs 16.

In order to retard the cooling of the edges of the glass sheet and thereby to cause the entire sheet to cool uniformly, the faces of the elements 10 are shaped to form reflectors which rise progressively from the flanges 11 to points 17 which are substantially at the centers of the faces of the cooling elements and adjacent the central portions of the opposite faces of the glass sheet 15. The slope of the reflecting surfaces between the flanges 11 and the points 17 is preferably uniform and the surfaces form cones or pyramids 18 as is shown in Figs. 1 and 2.

Figure 3:
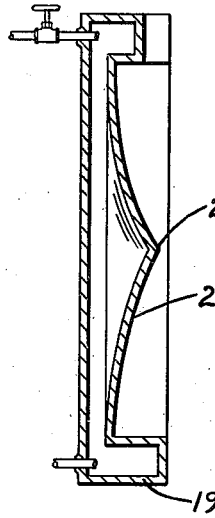
Fig. 3 is a vertical sectional view of a modified cooling element for cooling glass sheets in accordance with my invention.
Figure 2:
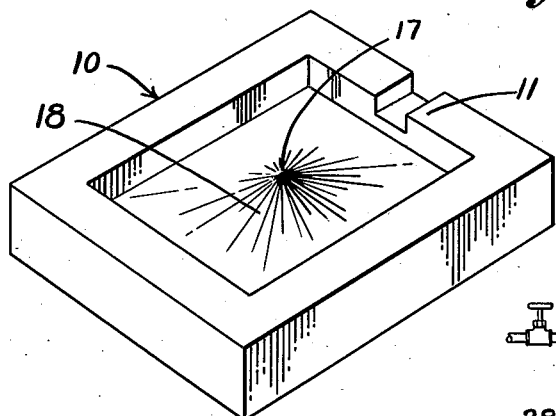
Fig. 2 is a perspective view of one of the cooling elements of Fig. 1 showing the face thereof in accordance with my invention.

As an alternative, the cooling elements 10 may take the form of the element shown in Fig. 3 which has a flange 19 and a point 20 corresponding, respectively, to flanges 11 and points 17 of Figs. 1 and 2. In this modified cooling element the slope of the reflecting surface btween the flange 19 and the point 20 is non-uniform and forms a spherical or non-spherical concavity 21.

Figure 4:
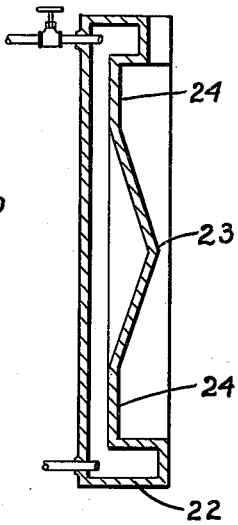
Fig. 4 is a vertical sectional view of another form of cooling element for cooling glass sheets in accordance with my invention.

In cooling the heated glass sheet 15 some of the heat which is radiated from the faces of the glass sheet is reflected aside by the angularly disposed reflecting faces of the cooling elements and is thereby caused to fall upon the edges of the sheet. For some purposes it may be desirable to reflect more heat into the edges of the sheet by reflecting back into the edges a maximum amount of the heat which is radiated from the edges. For this purpose I have shown in Fig. 4 another form of cooling element which has a flange 22 and a point 23 corresponding respectively to flanges 11 and points 17 of Figs. 1 and 2 but is additionally provided with a plane reflecting area 24 around the periphery of its substantially conical reflecting face adjacent the edges of the glass sheet in such manner as to be substantially parallel to the edges of the sheet.

By thus directing into the edges of the sheet some of the heat which is radiated from the more slowly cooling central portion thereof the tendency of the edges to cool more rapidly can be overcome and when the proper coefficient of reflection of the cooling faces has been selected, sufficient heat will be transferred from the central areas to the edges of the glass sheet to cause the entire sheet to cool uniformly. The proper coefficient of reflection may readily be determined by trial. It will be apparent that the rapidity of cooling will depend upon the speed with which heat is carried away by the circulating liquid cooling medium and for the purpose of tempering an article, a liquid of high specific heat, such as water should preferably be used and it should be circulated rapidly. For slower cooling, as for annealing, liquids of low specific heat may be used or the elements may be solid and cooled in air.

Figure 5:
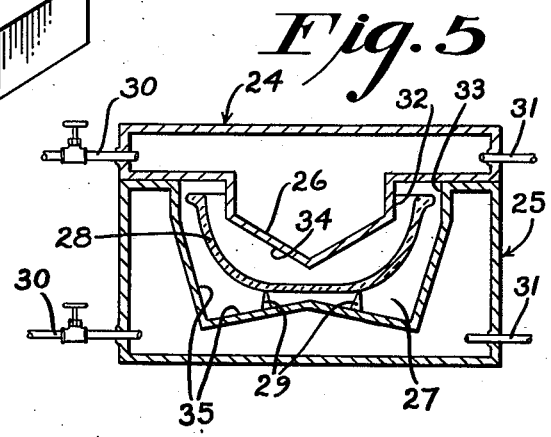
Fig. 5 is a vertical sectional view of a device for cooling glass baking dishes in accordance with my invention.

The method above described for tempering or annealing glass sheets is also applicable to other glass articles such as baking dishes. In Fig. 5 an upper cooling element 24 rests upon a lower cooling element 25 and a conical cooling face 26 of the cooling element 24 projects into the recessed face of the element 25 forming a chamber 27. Within the chamber 27 a glass baking dish 28 which has been heated to a temperature above the strain point of the glass rests upon pointed supports 29 of non-conducting material such as transite, fire clay, or the like, so that the dish 28 is not in contact with the walls of the chamber 27. The cooling elements 24 and 25 are hollow and are provided with inlets 30 and outlets 31 for the circulation of cooling fluid. The elements 24 and 25 may be hinged or mounted in any suitable manner, not shown, to facilitate their being separated or brought into closed relation. The coefficient of reflection of the cooling faces is preferably substantially uniform. Peripheral areas 32 and 33 of the elements 24 and 25 which are adjacent the edges of the dish 28 are substantially parallel with the edges of the dish and are adapted to reflect back into the edges some of the heat which is radiated from the edges. Central areas 34 and 35 are disposed at angles to the edges of the dish and to each other and are adapted to reflect some of the heat which is radiated from the central portion of the dish outwardly towards the edges thereof. By suitable variation in the number, shape, and slope of the reflecting surfaces of the cooling faces glass articles of various shapes may be tempered or annealed with improved uniformity of the final stress.

While in the foregoing there has been shown and described the preferred embodiment of my invention, it is to be understood that minor changes in the details of construction, combination, and arrangement of parts may be resorted to without departing from the spirit and scope of my invention as claimed.

What I claim is:

1. An apparatus for cooling glass articles which includes a cooling element, at least part of the face of which is shaped to form a substantially conical elevation having its apex substantially at the center of the face.

2. An apparatus for cooling glass articles which includes a cooling element, the face of which is a reflector and which is shaped to form a substantially conical elevation having its apex substantially at the center of the face.

3. An apparatus for cooling glass articles which includes a cooling element, the face of which is a reflector having a substantially uniform coefficient of reflection and which is shaped to form a substantially conical elevation having its apex substantially at the center of the face.

4. An apparatus for cooling glass articles which includes a cooling element, the face of which is a reflector and which is shaped to form a plurality of surfaces, the surface at the periphery of the face being substantially parallel to the general plane of the face and the surface in the central portion of the face being disposed at an angle to the peripheral surface and rising to a point substantially at the center of the face.

5. An apparatus for cooling glass sheets which includes a cooling element the face of which is a reflector which rises to a point substantially at its center and a flange surrounding the reflector, the depth of which is greater than the height of the central point of the reflector.

6. The method of controlling the cooling of a glass article which includes reflecting into a selected portion of the article some of the heat which is radiated from another portion of the article.

7. The method of controlling the cooling of a glass article which includes reflecting into the edges of the article some of the heat which is radiated from the central portion thereof.

8. The method of tempering a glass sheet by heating it to a temperature above the strain point of the glass and chilling it which includes reflecting into the edges of the sheet some of the heat which is radiated from the central portion of the sheet and reflecting back into the edges of the sheet some of the heat which is radiated from the edges.

WALTER H. RISING.